United States Patent [19]
Pate et al.

[11] Patent Number: 5,893,048
[45] Date of Patent: Apr. 6, 1999

[54] METHOD AND APPARATUS FOR IDENTIFYING VIBRATION LEVEL OF PREVIOUSLY TESTED CD ROM DISCS

[75] Inventors: John Pate, Austin; Robert L. McMahan, Cedar Park, both of Tex.

[73] Assignee: Dell USA, L. P., Roundrock, Tex.

[21] Appl. No.: 782,226

[22] Filed: Jan. 13, 1997

[51] Int. Cl.[6] .................................................. G01H 17/00
[52] U.S. Cl. .............................. 702/56; 702/35; 702/115; 369/53; 369/44.32; 360/73.03; 395/183.18
[58] Field of Search .................................. 702/56, 34, 35, 702/103, 113, 115, 123, 142, 145, 148, 183, 185, 186; 360/73.03, 43, 78.04, 78.06, 78.09, 75, 77.05, 31, 73.01, 73.06, 73.07–73.09, 78.07; 371/21.1, 21.2; 395/183.18, 185.07, 309; 369/44.13, 44.32, 53, 56, 57, 32, 27, 33, 44.26, 44.27, 127–130, 189, 190, 217, 233, 239–241, 247, 263, 275.5; 318/611, 615, 565, 568.24, 616, 617, 460; 359/199; 73/1.48, 570, 578, 597, 602, 660, DIG. 1; 388/907.5, 909

[56] References Cited

U.S. PATENT DOCUMENTS

| | | |
|---|---|---|
| 4,477,755 | 10/1984 | Rickert .................................... 318/611 |
| 4,956,831 | 9/1990 | Saffaf et al. ............................... 369/32 |
| 5,032,776 | 7/1991 | Garagnon .................................. 318/611 |
| 5,428,473 | 6/1995 | Takizawa et al. ....................... 359/199 |
| 5,465,183 | 11/1995 | Hattori ................................. 360/78.09 |
| 5,510,939 | 4/1996 | Lewis ................................... 360/78.09 |
| 5,581,715 | 12/1996 | Verinsky et al. ........................ 395/309 |
| 5,636,193 | 6/1997 | Ohmi .................................... 360/73.03 |
| 5,731,973 | 3/1998 | Takaishi et al. ...................... 360/78.09 |
| 5,768,286 | 6/1998 | Hsu et al. ............................... 371/21.2 |

FOREIGN PATENT DOCUMENTS

| | | |
|---|---|---|
| 0560529A3 | 3/1993 | European Pat. Off. . |
| 0565068A2 | 4/1993 | European Pat. Off. . |
| 0655736A2 | 11/1994 | European Pat. Off. . |

*Primary Examiner*—Hal Oodge Wachsman
*Attorney, Agent, or Firm*—Haynes and Boone, LLP

[57] ABSTRACT

The vibration level of a CD-ROM disc is determined in a computer system by installing the disc onto the disc drive. The disc is spun on the disc drive up to an identification speed. The table of contents on the disc is read to determine by disc serial number that the disc is a data disc. Also, the serial number is compared with a file stored in memory to determine that the data disc has been previously tested. The system memory also provides testing information indicating a speed for operating the identified disc without noticeable vibration. The disc drive then operates the identified disc at the indicated speed.

18 Claims, 4 Drawing Sheets

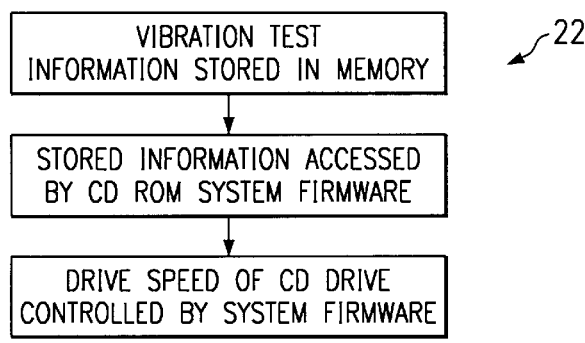
Fig. 4
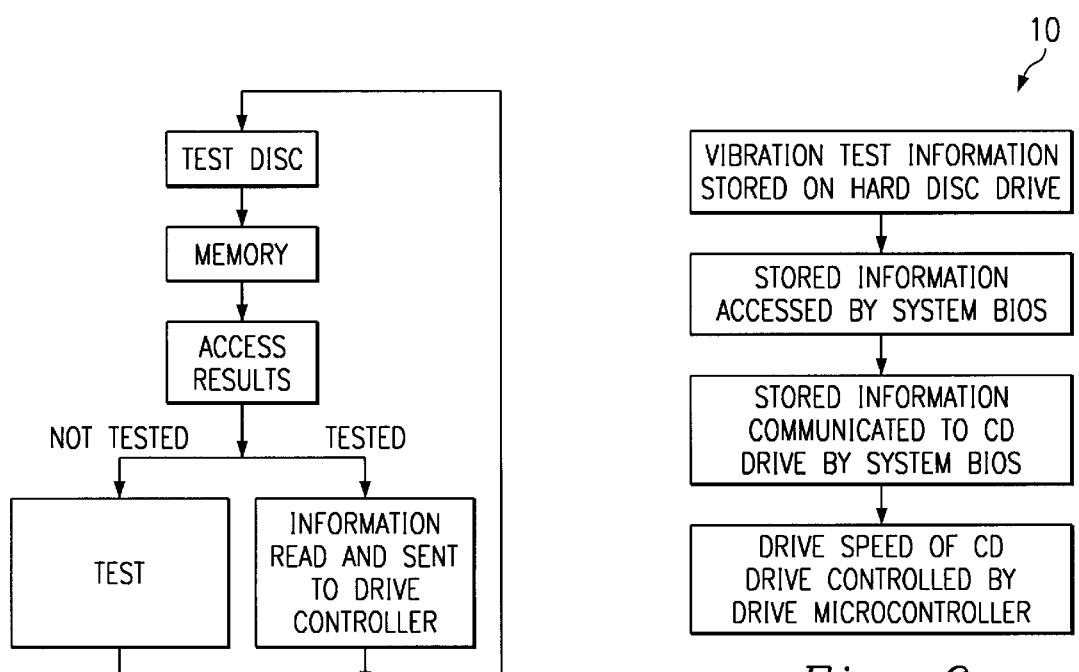
Fig. 5
Fig. 6

METHOD AND APPARATUS FOR IDENTIFYING VIBRATION LEVEL OF PREVIOUSLY TESTED CD ROM DISCS

BACKGROUND

The disclosures herein relate generally to a method and apparatus for identifying the vibration level of CD-ROM discs and more particularly to identifying a speed at which a CD can operate without noticeably vibrating and subsequently identifying that CD each time it is used so that the CD is automatically operated at that speed.

With the advent of faster and faster CD ROM drives, which are attaining speeds of 10×, 12×, and faster, vibration and noise from the use of unbalanced or warped CDs has become more pronounced. Such vibration can be caused by CDs which are out-of-round and thus vibrate from the eccentric effect of uneven forces directed radially coincident with the plane in which the CD spins. Vibration from warped CDs causes a wobble effect of uneven forces directed axially and substantially coincident with the spin axis of the CD.

In the normal spin-up of a CD-ROM disc, the disc is inserted into the appropriate slot in the computer and spun-up to 1× to read the table of contents. The disc is automatically identified as either an audio (i.e. music) or data disc. If it is an audio disc it is operated at 1× which is a speed which would not cause noticeable vibration even if the disc was unbalanced or warped. If it is a data disc it spins up to the maximum speed of the drive which is often 8× or faster. At this speed, vibration due to warped or unbalanced discs is not only noticeable but can cause data to be mis-read.

The use of CDs manufactured to less than exacting standards can result in such vibration and noise. Present manufacturing specifications call for the manufacture of CDs to be used with drives running at 1× and 2×. At these speeds, vibration and noise are not as pronounced. Also, in the past, faster CD ROM drives were available only for desktop computers where vibration is less noticeable due to the relatively larger size of the desktop units, i.e., more damping mass.

Now, faster CD ROM drives are being introduced into the portable PC market. However, the relatively smaller, lighter weight laptop portable units, i.e., notebooks as they are known, have less damping mass than the desktop size units and thus provide little room to implement vibration damping measures. Also, due to the nature of notebook computer use, the unit is often placed on the users lap where vibration is even more noticeable and can be quite annoying.

One method has been developed for testing CD Rom discs for vibration. That method measures laser head movement and thus determines the vibration level of a disc. When vibration is too great, the speed is reduced to a level where vibration is not noticeable. However, each time a disc is to be used, whether it is a disc being used for the first time, or a disc that has been previously tested, the disc must be tested for vibration and the speed reduced if necessary. There is no known method for identifying previously tested discs and automatically setting the correct speed for that disc at which no noticeable vibration will occur.

Therefore, what is needed is a method and apparatus for reading and storing speed data at which a particular CD can operate without noticeable vibration, by testing the CD and subsequently enabling a user to access the data to repeatedly operate the previously tested CD at the speed at which the CD will not noticeably vibrate.

SUMMARY

One embodiment, accordingly, provides a method of identifying the vibration level of previously tested CD ROM discs so as to identify an indicated speed at which any CD can operate without noticeably vibrating and enable the user to repeatedly operate that disc at that speed. To this end, a computer system including a CD disc drive, provides a method of identifying the vibration level of CD-ROM discs. A CD-ROM disc is installed onto the disc drive. The disc is spun on the disc drive up to an identification speed. The table of contents on the disc is read to determine that the disc is a data disc. System memory is searched for testing information indicating a speed for the identified disc to operate without noticeable vibration. The disc is then operated at the indicated speed where vibration is not noticeable.

A principal advantage of this embodiment is that once the indicated speed for a disc is determined, the system will automatically operate the disc at the speed each time the disc is used. Time is saved each time a tested disc is re-run since the indicated speed for operating the disc has previously been measured and recorded, and thus is referenced.

BRIEF DESCRIPTION OF THE DRAWINGS

FIG. 4 is a block diagram illustrating the steps of an embodiment of a component level method disclosed herein.

FIG. 5 is a flow chart illustrating the steps of an embodiment of the method disclosed herein.

FIG. 6 is a block diagram illustrating the steps of an embodiment of a system level method disclosed herein.

DETAILED DESCRIPTION OF THE PREFERRED EMBODIMENT

Figure 1:
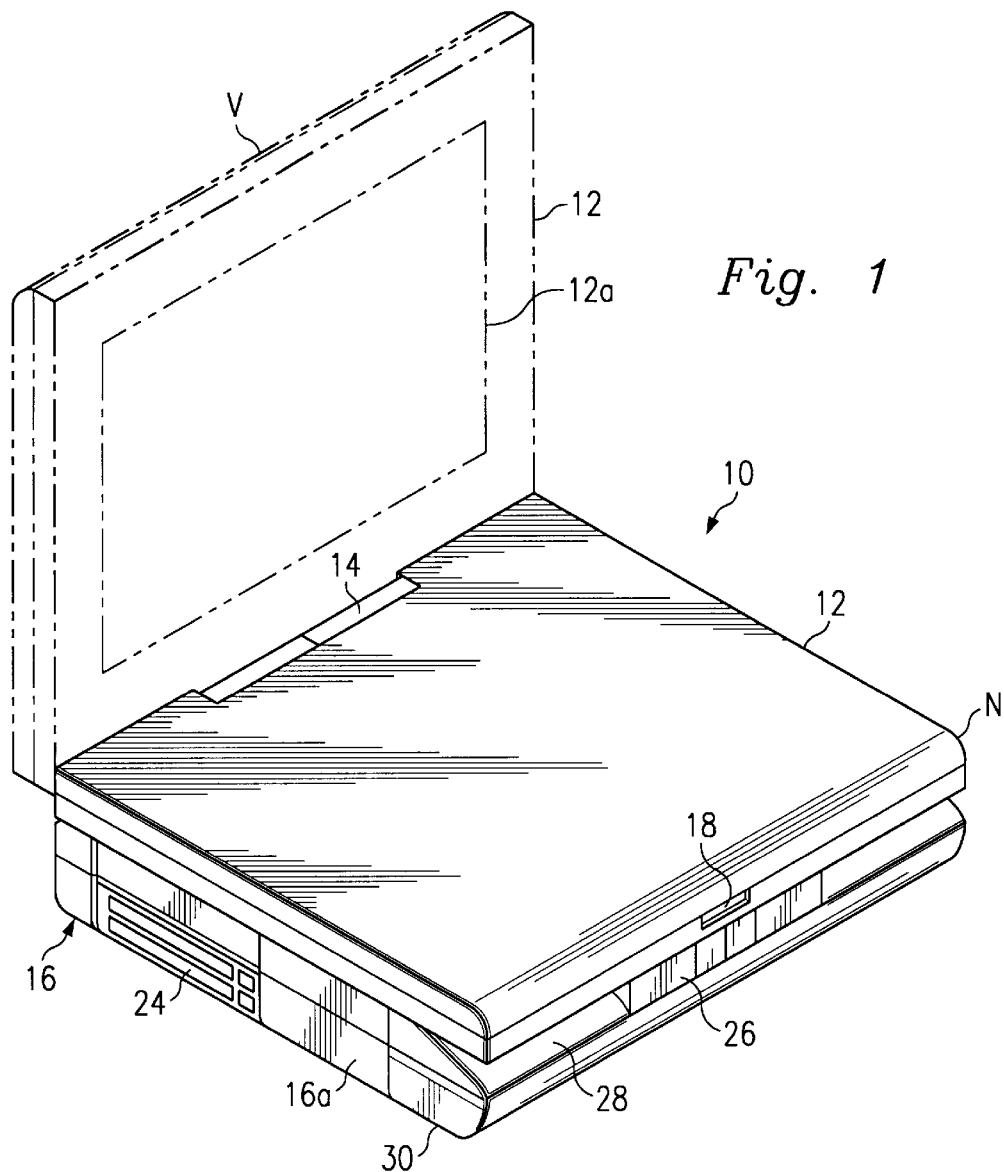
FIG. 1 is an isometric view illustrating an embodiment of a portable computer disclosed herein.
Figure 1A:
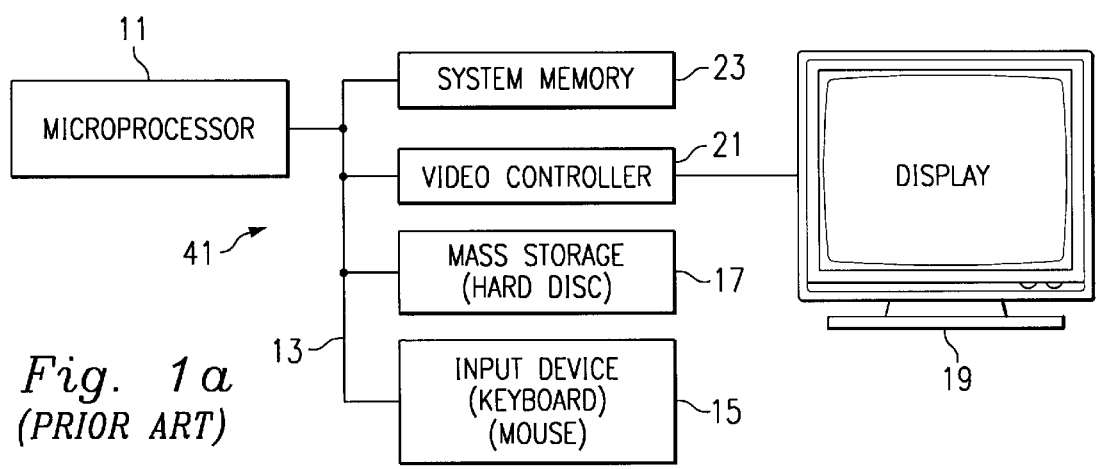
FIG. 1a is a diagrammatic view illustrating an embodiment of a typical computer system.
Figure 2:
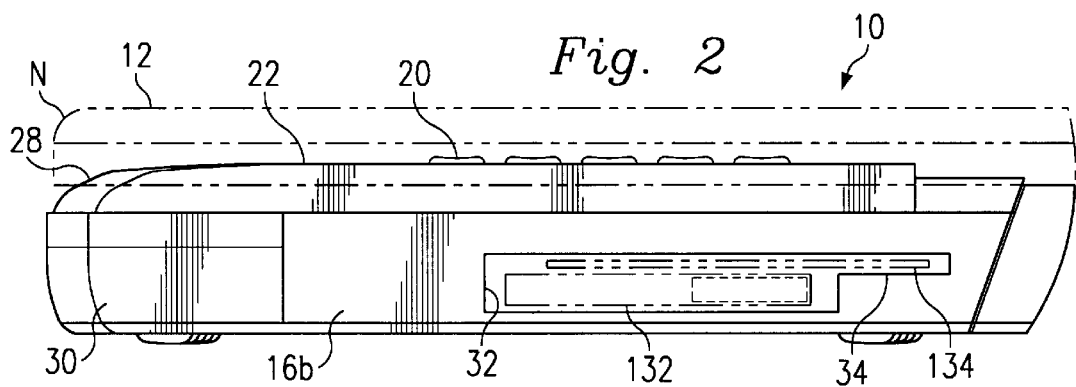
FIG. 2 is a side view illustrating an embodiment of the portable computer of FIG. 1.

Referring to FIGS. 1 and 2, illustrated is a portable, notebook size computer designated 10 including a self-contained computer system 41, FIG. 1a, and having a hinged top or lid 12 rotatable about a pivotable member 14 from a nested position "N", FIG. 2, with a horizontal base 16, to a substantially vertical or open position "V" shown in FIG. 1.

In one embodiment, computer system 41, FIG. 1a, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Opening of the notebook style portable computer by manipulation of a latch 18, reveals a plurality of keys 20, FIG. 2, on an exposed horizontal keyboard surface 22 of base 16, and a monitor screen 12a in an exposed portion of lid 12, FIG. 1. Computer 10 also includes a sidewall 16a having plurality of external ports, an exemplary one of which is designated 24. Base 16 may also include a pointing device 26, FIG. 1, such as a track pad, track ball or the like. A palm rest 28 is commonly provided adjacent keyboard 22, which forms an upper surface of a battery housing 30. Housing 16 includes a disc access slot 32, FIG. 2, formed in a sidewall 16b opposite sidewall 16a of housing 16. Slot 32 is generally rectangular and is integrally formed with a slit 34. Slot 32 is of a size sufficient to receive a rectangular CD ROM disc drive module 132 for driving a CD ROM disc 134.

Figure 3:
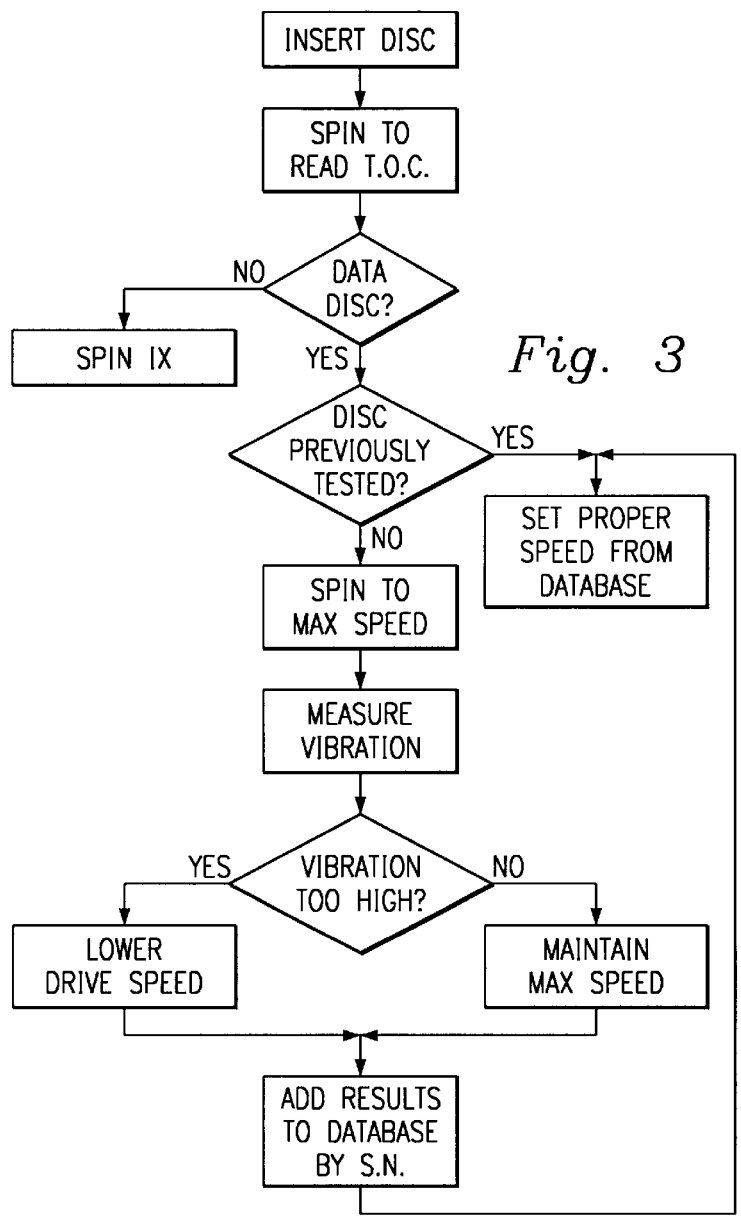
FIG. 3 is a flow chart illustrating the steps of an embodiment of the method disclosed herein.

Referring to FIG. 3, the flow chart illustrates that a CD-ROM disc is inserted into an operating computer system such as an activated notebook computer. The disc drive spins the disc at a speed of 1× so that a well known laser head reads the table of contents of the disc. Typically, the table of contents identifies the disc by serial number as either an audio disc or a data disc. If the table identifies the disc as an audio disc, the drive continues to spin the disc at the 1× speed, which is a speed where unbalanced or warped discs can be spun without any noticeable or adverse affects.

If the table identifies the disc as a data disc, the serial number is compared with a file stored in memory to determine that the disc has been previously tested according to the present invention. A record of the disc indicated operating speed, stored in a database in the system memory, can instruct the disc drive to adjust to the identified speed for the respective disc. The database would include information regarding the CD disc serial number, the identified speed for the tested disc and the date the disc was last used.

In the disclosed embodiments, however, if the file stored in memory has no record of the data disc having been previously tested, the disc drive will respond accordingly and spin up to the maximum speed of the drive and the vibration data will be measured by the laser head (not shown). In order for a CD drive to be able to read data from a disc, the laser head must be able to stay focused on spiral tracks which contain information represented by small pits formed in a layer of the disc. Therefore, it is essential for the laser head to be properly aligned along the spiral tracks. The laser head must also be focused vertically (in the Z direction) which indicates relative distance between the disc and the laser read head. Therefore, when a vibrating disc is spinning, the laser must move very quickly to stay focused on the spiral track. Thus, the magnitude of the laser head movement is proportional to the vibration of the disc. In this manner, the laser head functions as a sensor for sensing the vibration in both unbalanced and warped discs.

The vibration sensed is converted to a suitable measurement and then compared to an acceptable level of vibration at which the disc can be successfully read. If the vibration is below the acceptable level, the maximum speed is maintained and this information is added to the database information stored in the memory. Subsequently, each time the disc is identified by the table of contents and the database is checked, the disc drive will be operated at maximum speed where the identified disc was successfully tested. If, however, the vibration is above the acceptable level, the disc drive speed is sequentially reduced to 4×, 2× etc. until the vibration is reduced to below the acceptable level and the disc can be successfully read. Then, the indicated speed information is added to the database information stored in the system memory so that each time the disc is identified by the table of contents and the database is checked, the disc drive will be operated at the highest speed at which the identified disc was successfully tested.

The foregoing can be accomplished by a system level solution or a component level solution. Generally, either solution is described in FIG. 5 which provides a system for testing a disc. Test results are relayed to a non-volatile memory which can include a hard disc drive, a Flash RAM, or the like. Test results can be accessed by a system BIOS (basic input, output system), CD ROM firmware, or the like. Accessing the test results indicates whether a disc has been tested or has not been tested. If the disc has been tested, the information accessed is read and sent back to the CD ROM controller. If the disc has not been tested, the system is instructed to test the disc.

Figure 7:
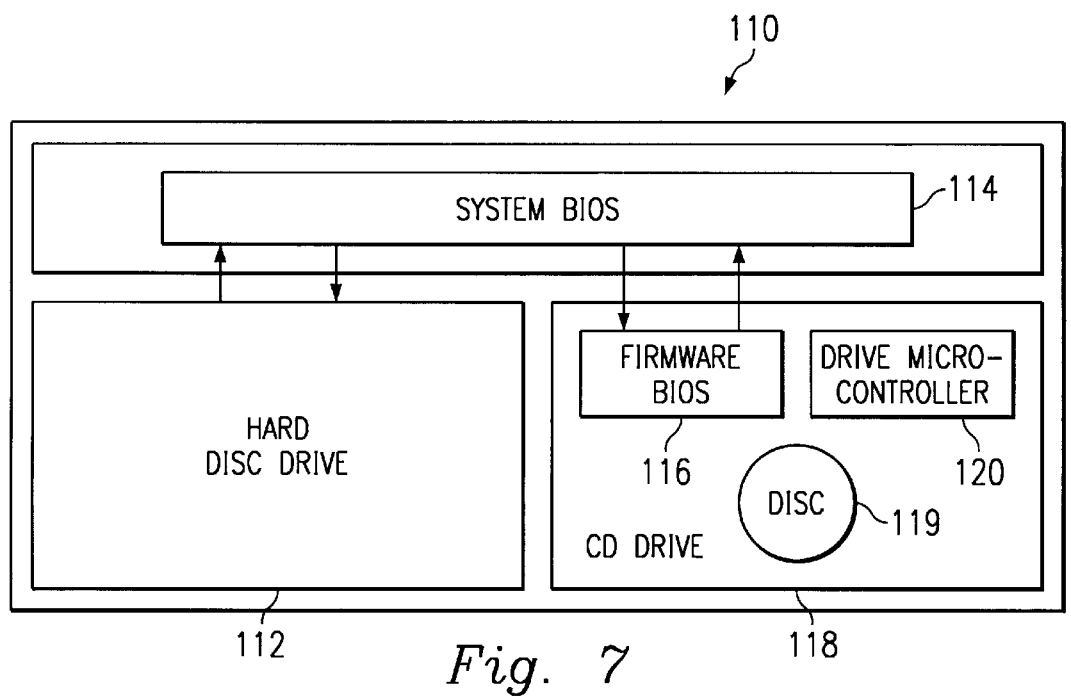
FIG. 7 is a diagram illustrating an embodiment of the system level method and apparatus disclosed herein.

The system level solution 110, FIGS. 6 and 7, includes vibration test information being stored on a hard disc drive 112. The stored vibration test information is accessed by the system BIOS 114. The stored information is communicated to a firmware BIOS 116 in a CD drive 118 by the system BIOS 114. The drive speed of the CD drive 118 is then controlled to spin a disc 119 by a drive microcontroller 120. In this type of system solution 110, the hard drive access time may be on the order of 10–15 milliseconds, for example.

Figure 8:
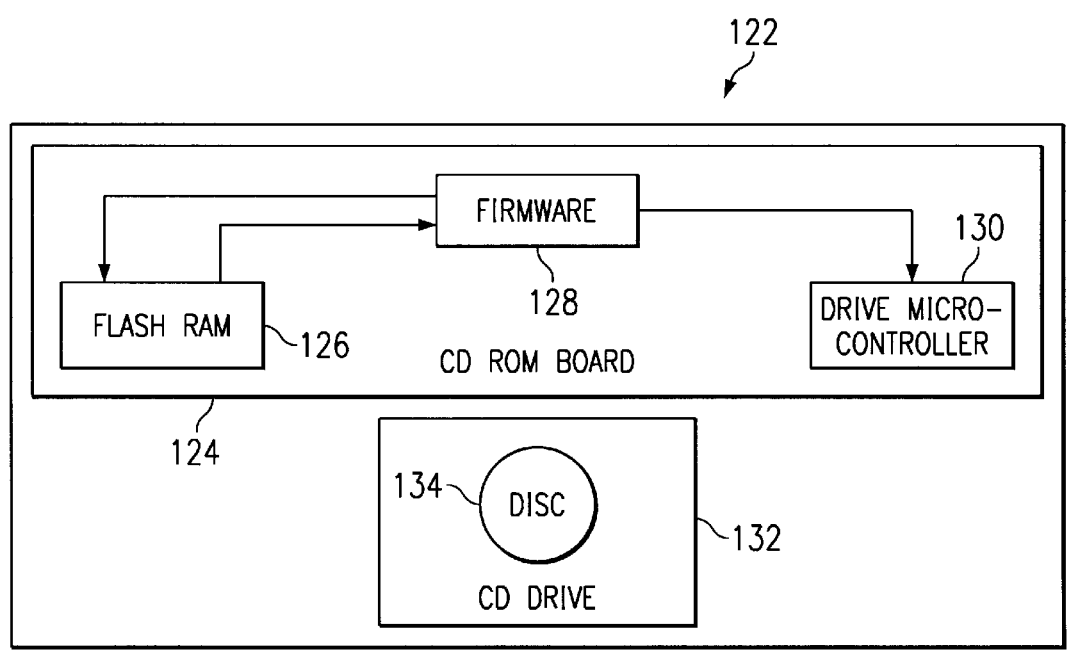
FIG. 8 is a diagram illustrating an embodiment of the component level method and apparatus disclosed herein.

The component level solution 122, FIGS. 4 and 8, includes vibration test information being stored on a CD ROM board 124 such as in a Flash RAM 126. The stored information is accessed by CD ROM component firmware 128, i.e., analogous to the system BIOS. The firmware controls a drive microcontroller 130, to operate CD drive 132 and spin a disc 134, i.e., the firmware 128 is the BIOS for drive 132. In this type of system solution 122, the Flash RAM 126 access time may be on the order of 30 nanoseconds, for example.

The component firmware 128 is modified by adding code to carry out the preferred embodiment. When the disc table of contents identifies the disc as a data disc, and identifies the serial number, the component firmware 128, instructs the system to read the Flash RAM 126 to locate the previously determined test results of the identified disc. The firmware 128 instructs the drive microcontroller 130 to spin the disc 134 at the previously determined indicated speed. This indicated speed may be the maximum speed of drive 132 or may require a downshift to possibly 4× or 2×, for example.

When the disc table of contents identifies, by serial number, the disc as a data disc, but the memory has no file stored indicating that the disc has been previously tested, the firmware 128 of the CD ROM disc 134, instructs the system to test the disc. This is accomplished by spinning the CD-ROM drive 132 and disc 134 at the maximum system speed to measure the vibration. This is accomplished by the read head interpreting voltage peaks caused by the vibration and taking an average of minimum and maximum voltage readings. The average is then compared in a compare step, again accomplished by the component firmware 128 and hardware communicating with the CD ROM disc 134. If the compare step determines that the vibration is acceptable, the maximum spin speed is accepted as the indicated spin speed and that information is added to the database in the Flash RAM 126 identifiable by the serial number of the tested disc. If the compare step determines that the vibration is unacceptable, the maximum spin speed is lowered or downshifted to an exemplary 4× or 2× indicated speed. Once the reduced speed is accepted as the indicated spin speed, that information is added to the database in the system Flash RAM 126 identifiable by the serial number of the tested disc.

In operation, a CD-ROM disc 134 is inserted into the disc slot on a notebook computer. The disc spins at 1× while the table of contents is read. A previously read data disc is identified and the system database is checked for the indicated speed data for the identified disc. The system then sets the indicated speed for the identified disc thus assuring that the disc is properly read during operation.

As it can be seen, the principal advantages of these embodiments are that once the indicated speed for an identified disc is determined, the system will automatically operate the identified disc at that speed each time that disc is used. If the disc has not been tested, the testing procedure will determine an indicated speed for that disc and identify the disc and store the testing information in the system database. Time is saved each time a tested disc is re-run since there is no need to search for and determine a suitable speed for a tested disc. The embodiments herein negate the necessity to test CD ROM discs that have been previously tested by a vibration testing CD ROM drive. This may provide a 4 second time savings in the ability to retrieve information from a CD ROM drive each time a disc is inserted.

Although illustrative embodiments have been shown an described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of testing a CD-Rom disc in a computer system comprising the steps of:

installing the CD-ROM disc onto a disc drive in the computer system;

spinning the disc on the disc drive up to an identification speed;

identifying, by reading a disc serial number in a table of contents included on the disc, that the disc is a data disc;

determining, by comparing the serial number with a file stored in memory, if the data disc has been previously tested for vibration and that test data is stored in the memory in the system;

searching, in response to determining that the disc has been tested, for test data stored in the memory indicating a speed for the identified disc to operate without noticeable vibration; and operating the identified disc at the indicated speed.

2. The method of testing a CD-Rom disc as defined in claim 1 wherein the step of searching for test data comprises the step of searching memory stored on a hard disc drive.

3. The method of testing a CD-Rom disc as defined in claim 1 wherein the step of searching for test data comprises the step of searching memory stored in a Flash RAM.

4. The method of testing a CD-Rom disc as defined in claim 1 wherein the step of searching for test data comprises the step of accessing the stored test data by system software.

5. The method of testing a CD-Rom disc as defined in claim 4 wherein the step of operating the identified disc comprises the step of communicating the stored test data to the disc drive and controlling the disc drive by a microcontroller.

6. The method of testing a CD-Rom disc as defined in claim 4 wherein the step of operating the identified disc comprises the step of controlling the disc drive by the system software.

7. A method of identifying the vibration level of previously tested CD-Rom discs comprising the steps of:

installing a CD-Rom disc onto a disc drive in a computer system:

spinning the disc on the disc drive up to an identification speed;

identifying, by reading a disc serial number in a table of contents included on the disc, that the disc is a data disc;

determining, by comparing the serial number with a file stored in memory, if the data disc has been previously tested for vibration and that test data is stored in the memory in the system;

testing the disc for vibration and determining an indicated speed at which the disc will operate without noticeable vibration;

recording and storing test results data in system memory;

spinning subsequently a previously tested disc on the disc drive;

identifying by reading the disc serial number in the table of contents, that the disc is a data disc;

accessing the test results data by system software; and automatically operating the disc drive at the indicated speed when the previously tested disc is reinstalled on the disc drive.

8. The method of identifying the vibration level as defined in claim 7 wherein the step of recording and storing data comprises the step of storing data in a non-volatile memory.

9. The method of identifying the vibration level as defined in claim 7 wherein the step of recording and storing data comprises the step of storing data on a hard disc drive.

10. The method of identifying the vibration level as defined in claim 9 wherein the step of accessing the data comprises the step of accessing the data by system BIOS.

11. The method of identifying the vibration level as defined in claim 7 wherein the step of recording and storing data comprises the step of storing data in a Flash RAM.

12. The method of identifying the vibration level as defined in claim 10 wherein the step of accessing the data comprises the step of accessing the data by CD ROM system firmware.

13. A method of identifying the vibration level of previously tested CD-ROM discs comprising the steps of:

installing a CD-ROM disc onto a disc drive in a computer system;

spinning the disc on the disc drive up to an identification speed;

identifying, by reading a disc serial number in a table of contents included on the disc, if the disc is a data disc or an audio disc;

determining, in response to the disc being identified as a data disc, by comparing the serial number with a file stored in memory, if the data disc has been previously tested for vibration;

spinning the disc on the disc drive at a maximum operating speed in response to the data disc being determined not to be a previously tested disc;

measuring vibration of the disc at the maximum speed;

determining an indicated speed at which the disc can operate without noticeable vibration;

relaying data determining the indicated speed to memory for referenced access from the memory;

spinning, subsequently, the disc on the disc drive;

identifying, by reading the disc serial number in the table of contents, that the disc is a data disc;

determining by comparing the serial number with a file stored in memory the indicated speed at which the disc can operate without noticeable vibration; and operating the identified disc at the indicated speed.

14. The method of identifying the vibration level as defined in claim 13 wherein the step of determining the indicated speed comprises the step of searching memory in the system.

15. The method of identifying the vibration level as defined in claim 13 wherein the step of determining the indicated speed comprises the step of searching memory stored on a hard drive in the system.

16. The method of identifying the vibration level as defined in claim 13 wherein the step of determining the indicated speed comprises the step of searching memory stored in a Flash RAM in the system.

17. A computer system comprising:

a disc drive in the computer system;

means for spinning the disc in the disc drive up to an identification speed;

means for identifying, by reading a disc serial number in a table of contents included on the disc, that the disc is a data disc;

means for determining by comparing the serial number with a file stored in a memory, if the data disc has been previously tested for vibration and that test data is stored in the memory in the system;

means for searching, in response to determining that the disc has been tested, for test data stored in the memory indicating a speed for the tested disc to operate without noticeable vibration;

means for operating the tested disc at the indicated speed;

a CD ROM board;

memory means on the board for storing CD ROM disc vibration information;

a drive microcontroller on the board for driving the drive to spin the CD ROM disc; and system firmware for accessing the stored information, the firmware controlling the drive microcontroller.

18. The system as defined in claim 17, wherein the memory means is a Flash RAM.

* * * * *